United States Patent [19]

Janiak et al.

[11] Patent Number: 5,191,592
[45] Date of Patent: Mar. 2, 1993

[54] D.C. ELECTRIC ARC FURNACE WITH CONSUMABLE AND FIXED ELECTRODE GEOMETRY

[75] Inventors: Robert A. Janiak, Saint-Genest-Malifaux; Nicolas Meysson, Fessy, both of France

[73] Assignee: Clecim, Cergy Pontoise, France

[21] Appl. No.: 776,352

[22] PCT Filed: Mar. 15, 1991

[86] PCT No.: PCT/FR91/00215
§ 371 Date: Nov. 19, 1991
§ 102(e) Date: Nov. 19, 1991

[87] PCT Pub. No.: WO91/14912
PCT Pub. Date: Oct. 3, 1991

[30] Foreign Application Priority Data

Mar. 19, 1990 [FR] France ............... 90 03484

[51] Int. Cl.$^5$ ............... H05B 7/102
[52] U.S. Cl. ............... 373/107; 373/108
[58] Field of Search ............... 373/107, 108, 102, 103, 373/60

[56] References Cited

U.S. PATENT DOCUMENTS

| | | | |
|---|---|---|---|
| 1,983,544 | 12/1934 | Ingelsrud | 373/103 |
| 4,016,355 | 4/1977 | Stenkuist | 373/102 |
| 4,821,284 | 4/1989 | Janiak et al. | 373/107 |
| 4,907,244 | 3/1990 | Konig et al. | 373/102 |

FOREIGN PATENT DOCUMENTS

| | | |
|---|---|---|
| 231880 | 8/1987 | European Pat. Off. . |
| 255793 | 2/1988 | European Pat. Off. . |
| 269465 | 6/1988 | European Pat. Off. . |
| 1565300 | 2/1970 | Fed. Rep. of Germany . |
| 382457 | 2/1908 | France . |

*Primary Examiner*—Geoffrey S. Evans
*Assistant Examiner*—John A. Jeffery
*Attorney, Agent, or Firm*—Pollock, Vande Sande & Priddy

[57] ABSTRACT

A direct current electric furnace for melting metal raw material, especially scrap iron, comprises two consumable electrodes separated from one another and both offset laterally on the side of the median plane P1 of the vessel turned towards the current source. At least four fixed electrodes are distributed on either side of the median plane and arranged substantially at the vertices of a regular polygon symmetrical with respect to the median plane and placed between the vertical projections of the consumable electrodes, the conductors of the electrodes placed towards the source being orientated directly towards the latter, parallel to the conductors of the consumable electrodes and the conductors of the electrodes placed on the side opposite to the source each comprising a first branch passing around the vertical projection of the corresponding consumable electrode and a second branch orientated towards the source parallel to the conductors connected to the consumable electrodes.

5 Claims, 3 Drawing Sheets

D.C. ELECTRIC ARC FURNACE WITH CONSUMABLE AND FIXED ELECTRODE GEOMETRY

FIELD OF THE INVENTION

The invention relates to a direct current electric furnace for the melting of metal raw material, especially scrap iron.

BACKGROUND OF THE INVENTION

Electric furnaces used for the melting of scrap iron or other raw material and the reduction of the bath of metal obtained, with optional addition of alloy elements until a metal of determined composition is obtained, have long been known in the art.

An electric furnace is generally constituted by a vessel delimited by a lateral wall and a bottom covered with a sole of refractory material and closed with a removable dome-shaped lid.

At least one electrode, called consumable, generally constituted by a bar of graphite, penetrates inside the vessel. Each electrode is supported by an arm extending above the dome and is mounted for vertical movement, so as to pass through the dome and descend into the raw material loaded into the furnace. This raw material, which is generally constituted by scrap iron, is in contact with at least one fixed electrode passing through the bottom and the refractory sole.

In the case of a single-phase alternating current furnace or of a direct current furnace, the consumable electrode and the sole electrode are connected to the two poles of a current source.

In the case of a two- or three-phase alternating current furnace, the consumable electrodes are connected to the poles of the current source and the charge is in contact with the sole electrode which constitutes the neutral of the system.

There are thus formed between the charge and each consumable electrode one or more electric arcs, which produce the melting of the scrap iron and the formation of a bath of metal in the bottom of the vessel.

Until recently, furnaces supplied with alternating current in particular were used, but it was found that the supply of direct current to the electrodes brought a number of advantages such as reduced noise and increased energy efficiency because it is possible to use higher voltages than those permitted with alternating current.

Provided that the charge is in scrap-iron form, the electrodes penetrate the latter by digging holes in it which determine a sort of insulation of the arcs from one another and tend to stabilize them. On the other hand, when the charge is entirely melted, the arcs which are subject to the magnetic effects created by the current passing through the electrodes, through the conductors which connect the electrodes to the current source and through other parts of the installation, may form in unpredictable directions and are therefore very unstable.

The zone in which the arcs form, which is at the highest temperature, can therefore not be kept at the center of the furnace, the walls and bottom of which may be subjected to excessive temperatures and substantial wear of the refractory lining.

Applicants have already disclosed, in U.S. Pat. No. 4,821,284, a process for controlling the direction of the electric arcs in a direct current furnace, even at high power levels.

To this end, instead of separating the conductors as far as possible from the furnace in order to avoid the influence of the magnetic fields produced by the passing of the current, the conductors connected to the fixed electrodes are, on the contrary, made to pass along the lower face of the bottom and as close as possible to the latter determining the profile and orientation of the path followed by the conductors so that the passing of the current produces magnetic fields, the mutual effects of which, with respect to deviation of the arcs, and taking into account all of the magnetic influences exerted in operation by the other conductors and the various parts of the installation, are such, that the arcs tend to converge towards a predetermined zone of the bath of metal.

The intensities which can be made to pass in the conductors and the electrodes, in particular the sole electrodes, are limited, and several consumable electrodes and several sole electrodes must therefore be used. In U.S. Pat. No. 4,821,284, several arrangements were envisaged, using in particular three consumable electrodes and three fixed electrodes.

The arrangement and orientation of the conductors of the fixed electrodes are determined by a prior calculation taking into account the general arrangement of the installation and, in particular, of the electrodes. To this end, a mathematical model is made first permitting calculation of the effects on the arcs of all of the elements through which an electric current flows, taking into account the intensities, the magnetic characteristics of the various parts of the installation, of the changes in the charge and of the temperatures during the various phases of the melting operation, and distinguishing in the calculations between the fixed elements the characteristics and positioning of which are fixed in advance and the variable elements on which it is possible to act. The routing of the conductors can thus be determined by calculating in advance the foreseeable effects on the arcs.

Among the fixed elements must be cited in particular the general constitution of the furnace, such as the shape of the vessel and of its supports, the accessory components such as the taphole and its means of closure, the support arms of the consumable electrodes along which the corresponding conductors generally pass and the position of the current source which, generally, is placed as close as possible to the vessel so as to limit the length of the conductors.

In U.S. Pat. No. 4,821,284, the main concern was to act upon the routing of the conductors by calculating, by means of the mathematical model, the various magnetic effects resulting from it, so as to determine the optimum arrangement requiring conductors of minimum length for effective control of the directions of the arcs.

The invention patent thus permits the construction of high capacity direct current furnaces.

Up to a capacity of about 110 tons, it is possible to use a single consumable electrode, the intensity not exceeding about 100,000 Amperes. In that case, it is relatively simple, by means of the process set out above, to control the direction of the arc, and three electrodes are generally used, fixed in a symmetrical arrangement around the vertical projection of the consumable electrode.

However, above about 110 tons, intensities have to be used which require the number of electrodes to be increased with a consequent risk of disturbances resulting from the mutual effects of the fields produced by the flowing of the current in the large number of conductors. It then becomes very difficult to perfect the mathematical model in view of the large number of elements to be taken into account, and their interactions.

The studies conducted by applicants have, however, led to a particularly advantageous arrangement of the electrodes and conductors which permits construction of furnaces, having a very high capacity, capable of exceeding 110 tons while effectively controlling the direction of the electric arcs.

SUMMARY OF THE INVENTION

According to the invention, the electric furnace comprises two consumable electrodes separated from one another and both offset laterally on the side of the median plane of the vessel turned towards the current source, and at least four fixed electrodes distributed on either side of the median plane and arranged substantially at the vertices of a regular polygon symmetrical with respect to the median plane and placed between the vertical projections of the consumable electrodes. The conductors of the electrodes placed on the source side are orientated directly towards the latter, parallel to the conductors of the consumable electrodes, and the conductors of the electrodes placed on the side opposite to the source each comprise a first branch passing around the vertical projection of the corresponding consumable electrode and a second branch orientated towards the source parallel to the conductors connected to the consumable electrodes.

In a preferred embodiment, the furnace comprises four fixed electrodes placed respectively in the four quadrants delimited by the median plane and a transverse reference plane perpendicular to the median plane and passing between the consumable electrodes, equidistant from the latter, the four fixed electrodes being arranged substantially at equal distances, respectively, from the median plane and from the transverse plane.

The consumable electrodes are generally arranged along a line substantially parallel to the longitudinal median plane of the vessel, offset to the source side, and the fixed electrodes are placed at the vertices of a quadrilateral comprising two sides substantially parallel to the median plane and two sides cutting said plane and being spaced closer together than the consumable electrodes, with the result that the latter are placed outside said quadrilateral. However, the precise positioning of the electrodes depends on a number of elements and, in particular on the position of the taphole which must be by-passed by a certain distance because of the heat given off.

The consumable electrodes will therefore be arranged in a zone having the form of a strip parallel to the median plane and offset laterally to the source side, and the fixed electrodes will themselves be placed in a zone having the form of a rectangular strip included between two concentric rectangles, inner and outer respectively, the sides of which are respectively parallel and perpendicular to the median plane. The precise positions of the electrodes inside said strips being determined by a prior calculation taking into account the mutual effects of the various parts of the installation so that, by mutual compensation of the magnetic effects of the flowing of the current, the electric arcs are subjected to fields which tend to direct them towards a determined zone of the bottom.

In particular, for a furnace having a capacity of more than 110 tons and for intensities which may exceed 120,000 Amperes, the strip in which the fixed electrodes must be situated is 400 mm wide and is centered on an axis at a distance of 600 mm from the median plane, and the rectangular strip in which the fixed electrodes must be situated is 300 mm wide and is centered on a square having sides equal to 2,500 mm, itself centered in the median plane and in the transverse plane equidistant from the consumable electrodes, the latter being separated by a distance of between three and four meters.

BRIEF DESCRIPTION OF THE DRAWINGS

The invention will be better understood from the following description of a particular embodiment with reference to the attached drawings.

DESCRIPTION OF PREFERRED EMBODIMENT

Figure 1:
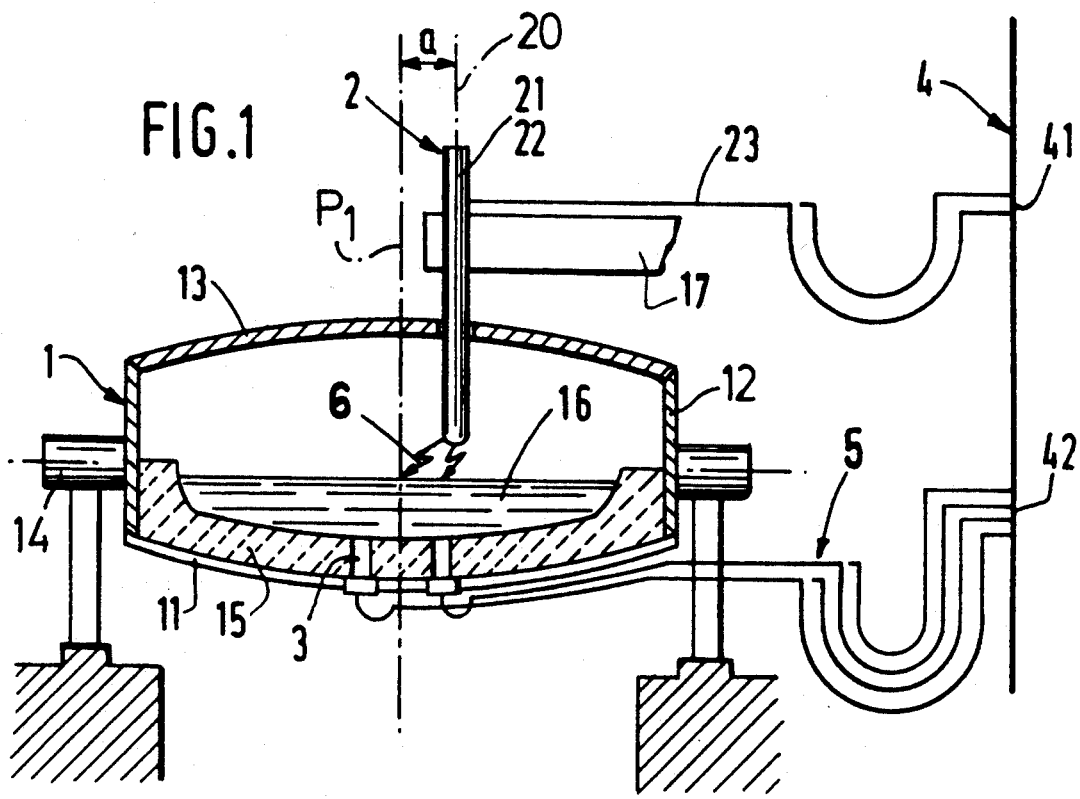
FIG. 1 is a front elevation, in cross-section, of a furnace according to the invention.
Figure 2:
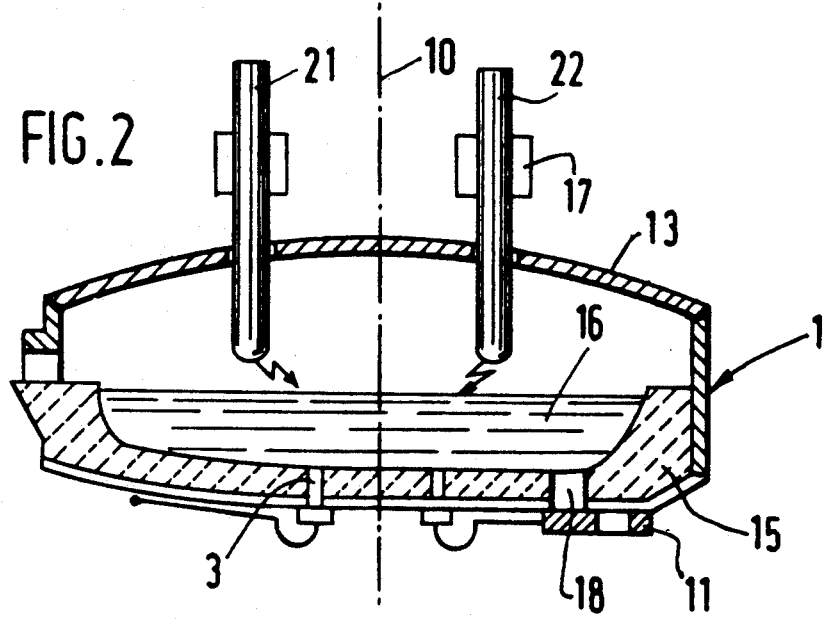
FIG. 2 is a longitudinal section of the furnace.

FIG. 1 shows schematically an electric furnace for melting scrap iron comprising a vessel 1 limited by a bottom 11 and a lateral wall 12 and closed by a removable dome-shaped lid 13. The vessel is supported by rolling or pivoting supports 14 enabling it to be tilted about a horizontal axis in order, for example, to pour out slag on one side across a sole 15 and molten metal 16 on the other side through a taphole 18, as shown in FIG. 2.

Each consumable electrode 2 is carried by an arm 17 along which is arranged the conductor 23 connecting the electrode 2 to a source 4 of direct current placed as close as possible to the vessel 1.

The consumable electrode 2 is constituted by a bar of graphite which slides in a support arranged at the end of the arm 17 and can be displaced vertically so as to enter the vessel 1, passing through the lid 13.

The means for supporting and gradually lowering the electrodes are well known and hence are not shown in detail.

The bottom 11 of the vessel 1 is covered with a sole 15 of refractory material in which are embedded fixed electrodes 3 which pass through the assembly of the bottom 11. Close to the vessel 1, but far enough away to be protected from the heat and splashed metal, is placed the source 4 of direct current, for example a transformer-rectifier comprising two poles, namely, a negative pole 41 connected by supply conductors 23 to the consumable electrodes 2, and a positive pole 42 connected by return conductors 5 to the sole electrodes 3.

By means of these well-known arrangements, the flow of the current in the electrodes leads to the formation of electric arcs 6 between the electrodes 2 and the scrap iron which, by melting, forms a bath 16 of liquid metal. The current is kept flowing until melting is complete and until the required composition is obtained by addition of alloy elements.

In the past it has been customary in electric furnaces to use either a single graphite electrode placed in the axis of the vessel, or three electrodes generally arranged at the vertices of an equilateral triangle centered on the axis.

Figure 3:
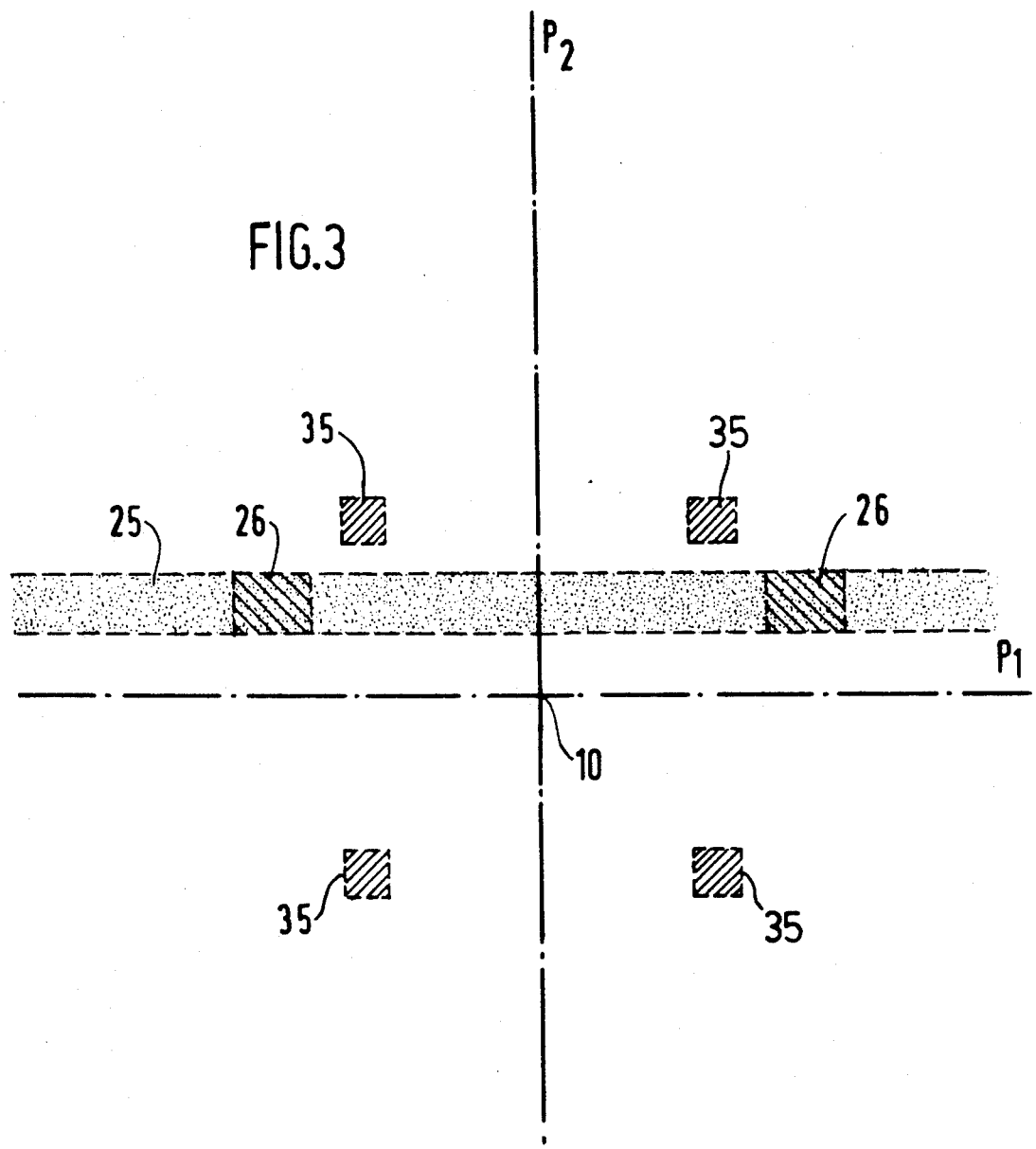
FIG. 3 is a schematic plan view of the zones for the positioning of the electrodes.

The present invention, however uses only two graphite electrodes 21, 22 which are centered on or close to a line 20 parallel to the longitudinal median plane P1 of the vessel and offset with respect to it by a distance "a" to the source 4 side, as shown in FIGS. 1 and 3.

The two electrodes 21, 22, are separated from one another by a distance b which, for a capacity of more than one hundred tonnes, may be from three to four meters.

Moreover, four sole electrodes 3 are used placed in two pairs on either side of the longitudinal plane P1, forming the vertices of a quadrilateral framed by the two consumable electrodes 21, 22.

FIG. 3 shows the arrangement of the electrodes with respect to two reference planes, the longitudinal median plane P1, which is perpendicular to the axis of tilt, and a transverse plane P2 perpendicular to P1, the two planes intersecting along a vertical axis 10.

The two consumable electrodes 21, 22, are placed on either side of the transverse plane P2, at distances b1, b2, and are offset towards the source, respectively by distances a1 and a2, with respect to the longitudinal plane P1. The distances a1 and a2 are substantially equal, but may however vary within a certain bracket, the precise positioning being determined by calculation and depending, as it has been seen, on a number of factors.

A zone 25 in the form of a narrow strip parallel to the longitudinal plane P1 can therefore be defined, in which the projections of the axes of the electrodes 21, 22, may be found.

In practice, for a furnace having a capacity of more than 110 tons, the distances a1 and a2 may vary between 400 and 800 mm, and the distances b1 and b2 may vary between 1500 and 2000 mm. The zone 25 in which the consumable electrodes may be located is therefore 400 mm wide and is centered on an axis 600 mm away from the median plane P1.

Inside this zone 25, two rectangular zones 26 symmetrical with respect to the plane P2 are defined, in which may be centered respectively the projections of the two consumable electrodes 21, 22, the precise positions being determined by calculation.

The positions of the fixed electrodes are also determined with respect to the two planes P1 and P2, each electrode 3 being at a distance c away from P1 and at a distance d away from P2.

The axes of the electrodes 3 are generally placed at the vertices of a quadrilateral centered on the two planes P1 and P2, but the precise positions are determined by calculation, the distances c and d for each electrode 3 being variable within a certain range.

Two rectangular zones 26 are thus defined, with respect to the reference planes P1 and P2, for positioning the consumable electrodes 21, 22, and four rectangular zones 35 for positioning four fixed electrodes, 31, 32, 33, 34, respectively.

For a furnace having a capacity of more than these different zones will be defined as follows:

the two consumable electrodes 21, 22, will be centered on either, side of the plane P2, each in a rectangular zone 26 delimited by two sides parallel to the longitudinal plane P1 and offset towards the source by 400 mm and 800 mm, respectively, and two sides parallel to the transverse plane P2 and offset from that plane by 1500 mm and 2000 mm, respectively;

the four fixed electrodes 31, 32, 33, 34, will each be centered respectively in one of the quadrants delimited by the planes P1 and P2, inside zones 35 in the form of a square delimited by four sides the pairs of which are parallel to the planes P1 and P2 and spaced from these two planes by 1000 mm and 1300 mm, respectively.

Normally, the reference plane P1 will be the longitudinal median plane of the vessel 1, orthogonal to the axis of tilt and in which is centered the taphole 18, the latter optionally being replaced by a sill extending into a spout for pouring by tilting.

Often, the transverse reference plane P2 will also be a plane of symmetry, but its position may vary depending on the characteristics of the vessel and the respective positions of its various components. For example, charging with raw material may be done in the axis of the vessel, between the two electrodes, or else through a laterally offset orifice, in particular when the raw material is scrap iron. In this case, it is preferable to offset the consumable electrodes to prevent them from being damaged.

The relative positions inside the furnace of the consumable and fixed electrodes, of the charging orifice and of the taphole may equally be determined on the basis of various technological considerations, for example, in order to produce a circuit for the gases used for pre-heating of the scrap iron, in or, to cause the arcs to converge towards a particular zone of the bottom, or to cause the electric currents to follow particular paths inside the bath of metal.

The possibilities of installing the fixed electrodes in the bottom of the vessel are also limited because it is necessary to take into account the positioning of the various components on which depend the paths which the conductors can be made to follow.

Figure 4:
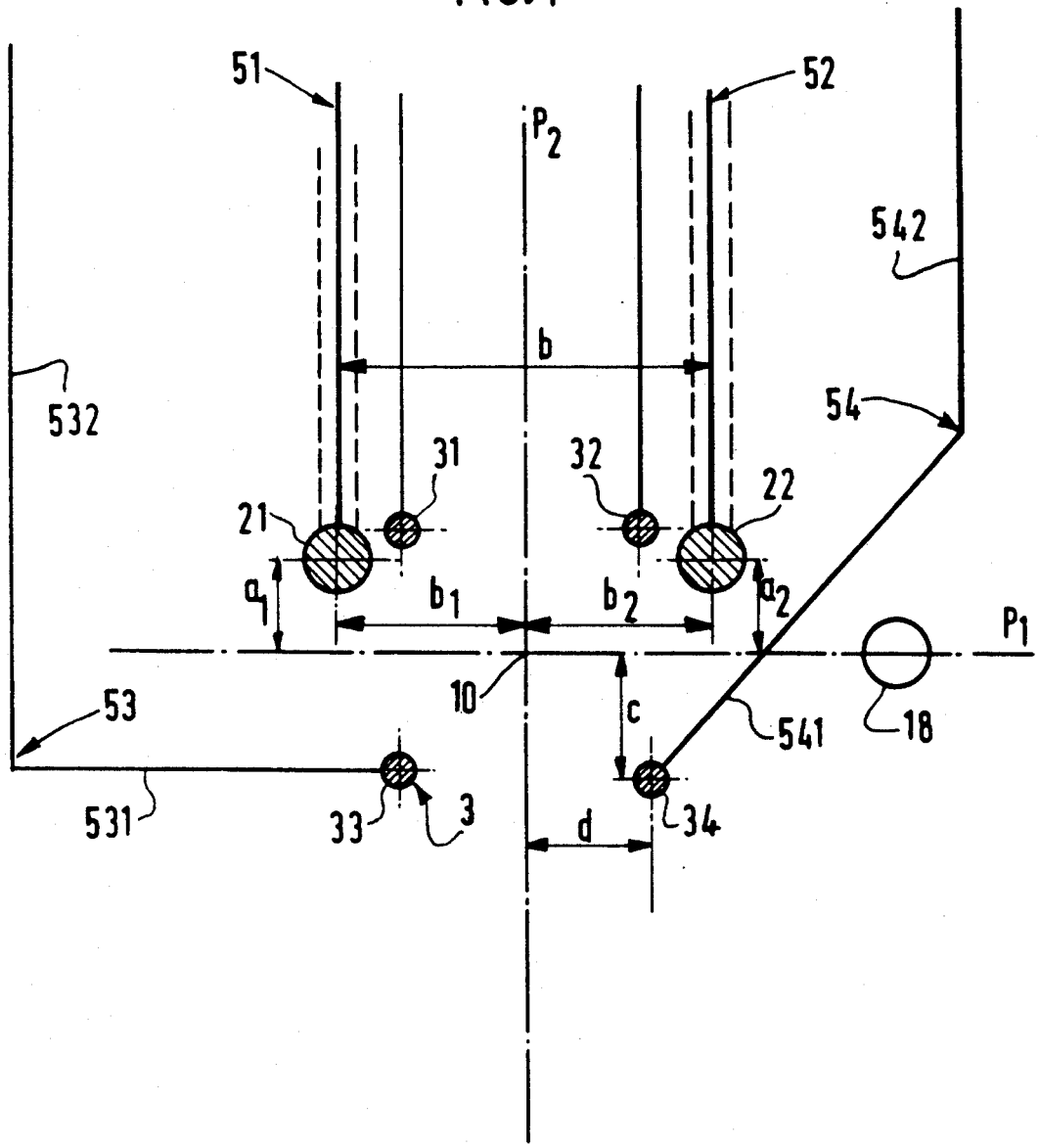
FIG. 4 is a plan view of the arrangement of the electrodes and of the conductors.

In fact, as indicated in FIG. 1, the supply conductors 23 connected to the consumable electrodes 21, 22 are connected directly towards the source 4 following the support arms 17, and are therefore normally parallel to one another and perpendicular to the plane P1. The offsetting of the electrodes 21, 22, towards the source 4 makes it possible to compensate for the magnetic effects due to the current flowing in the conductors 23 by bringing the consumable electrodes 21 closer to the fixed electrodes 31, 32, placed towards the source and connected directly to the latter by return conductors 51, 52 (FIG. 4), parallel to the supply conductors 23 and to the transverse plane P2.

On the other hand, the return conductors 53, 54, connected respectively to the fixed electrodes 33, 34, follow paths which by pass the consumable electrodes 21, 22, placed respectively on the same side of the transverse plane P2.

Thus, the return conductor 53 connected to the electrode 33 comprises a first branch 531 which extends from electrode 33 in a direction parallel to the plane P1 and a second branch 532 which connects with the source 4 in a direction parallel to the supply conductor 2, at a distance of about four meters from the reference plane P2.

However, the return conductor 54 connected to the fixed electrode 34 located near taphole 18 comprises a first branch 541 which extends obliquely with respect to the plane P1 so as to pass between the taphole 18 and the projection of the consumable electrode 22, and then connects up to a second branch 542 parallel to the supply conductor 23 of the electrode 22.

Such an arrangement of the electrodes and conductors allows mutual balancing of the magnetic effects, and in particular compensation for the effect of the aerial conductors 23, so that the electric arcs directed towards the fixed electrodes are subjected to minimum deviating force.

Furthermore, the current source 4 is constituted by rectifier-generators the connections of which with the various electrodes can be determined so as to produce current flows between the sole electrodes and the corresponding consumable electrodes, between two sole electrodes and the consumable electrode placed on the opposite side, between the sole electrodes and between the consumable electrodes. It is thus possible to create inside the bath a number of electrical circuits directed along controlled directions, which, owing to the magnetic forces thus developed, determine hydrodynamic stirring of the bath of metal contributing to the metallurgical process.

We claim:

1. Direct current electric furnace comprising
    (a) a vessel constituted by a bottom surrounded by a lateral wall and covered with a removable dome-shaped lid, said vessel being symmetrical with respect to a vertical median plane P1;
    (b) two consumable electrodes mounted so as to be capable of vertical displacement each at the end of a support arm extending above said dome and passing through said dome in order to enter said vessel, said consumable electrodes being separated from one another and both offset laterally on a side of said vertical median plane P1 turned towards a direct current source;
    (c) at least four fixed electrodes passing through said bottom on either side of said median plane and arranged substantially at vertices of a regular polygon symmetrical with respect to said median plane, said fixed electrodes being located between vertical projections of said consumable electrodes;
    (d) a direct current source comprising a negative pole and a positive pole respectively connected by conductors to said consumable electrodes and to said fixed electrodes, the conductors of said fixed electrodes placed towards said direct current source extending directly towards said direct current source, parallel to the conductors of said consumable electrodes, and the conductors of said fixed electrodes placed on a side opposite to said source each comprising a first branch passing around a vertical projection of a corresponding consumable electrode and a second branch extending towards said source parallel to the conductors connected to said consumable electrodes; and
    (e) means for loading into said vessel a metal raw material for melting of said metal raw material by production of electric arcs;
    (f) said conductors connected to said consumable electrodes passing said support arm and said conductors connected to said fixed electrodes passing along a lower face of said bottom and being directed along paths determined for each fixed electrode in accordance with magnetic effects of various parts of said furnace.

2. Electric furnace according to claim 1, said furnace comprising four fixed electrodes placed respectively in four quadrants delimited by said median plane and a transverse reference plane perpendicular to said median plane and passing between said consumable electrodes, equidistant from said consumable electrodes, the four fixed electrodes being arranged substantially at equal distances, respectively, from said median plane and said transverse plane.

3. Electric furnace according to claim 1 or 2, wherein said consumable electrodes are arranged in a zone having the form of a strip parallel to said median plane P1 and offset laterally towards said source, and said fixed electrodes are each placed in a rectangular zone delimited by four sides parallel and perpendicular respectively to said median plane, precise positions of said fixed electrodes inside said rectangular zones being determined by a prior calculation taking into account the mutual compensation of said magnetic effects of current flow, said electric arcs are subjected to fields tending to direct them towards a predetermined zone of said bottom.

4. Electric furnace according to claim 1 or 2, said furnace having a capacity of more than 110 tons and intensities which may exceed 120,000 Amperes, wherein said consumable electrodes are placed in a zone having a width of 400 mm and centered on an axis at a distance of 600 mm from said median plane, and are separated from one another by a distance of between three and four meters, and wherein said fixed electrodes are each placed at distances from said two reference planes P1 and P2 of between 1000 and 1300 millimeters, respectively.

5. Electric furnace according to claim 1 or 2, wherein said direct current source is constituted by rectifiers-generators having connections with said fixed and consumable electrodes which corrections are predetermined to produce not only main current flows between two fixed electrodes and a consumable electrode located on a same side of said transverse plane P1, but also at least some secondary current flows between two fixed electrodes and a consumable electrode placed on the opposite side, between the two consumable electrodes and between the fixed electrodes, so as to create inside a bath of said metal raw material various electrical circuits along controlled directions capable of developing inside said bath magnetic forces producing hydrodynamic stirring contributing to a metallurgical process.

* * * * *